US009908676B2

(12) United States Patent
Sheehan et al.

(10) Patent No.: US 9,908,676 B2
(45) Date of Patent: Mar. 6, 2018

(54) MAGAZINE APPARATUSES FOR HOLDING GLASSWARE DURING PROCESSING

(71) Applicant: Corning Incorporated, Corning, NY (US)

(72) Inventors: Brian Christopher Sheehan, Elmira Heights, NY (US); Steven Edward DeMartino, Painted Post, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 94 days.

(21) Appl. No.: 14/808,710

(22) Filed: Jul. 24, 2015

(65) Prior Publication Data
US 2016/0039588 A1     Feb. 11, 2016

Related U.S. Application Data

(60) Provisional application No. 62/035,798, filed on Aug. 11, 2014.

(51) Int. Cl.
*B65D 71/70*     (2006.01)
*C03C 21/00*     (2006.01)
*B25B 11/00*     (2006.01)

(52) U.S. Cl.
CPC ............ *B65D 71/70* (2013.01); *B25B 11/00* (2013.01); *C03C 21/002* (2013.01)

(58) Field of Classification Search
CPC ... B25B 11/00; C03C 23/0075; C03C 21/002; B65D 5/48038; B65D 21/0212;
(Continued)

(56) References Cited

U.S. PATENT DOCUMENTS 355,997 A     1/1887    Joyce
390,735 A     10/1888   Wieland
(Continued)

FOREIGN PATENT DOCUMENTS

CN     201641040 U     11/2010
CN     202642183 U     1/2013
(Continued)

OTHER PUBLICATIONS

International Search Report & Written Opinion dated Aug. 30, 2016 for PCT/US2016/031647 filed May 10, 2016. pp. 1-12.
(Continued)

*Primary Examiner* — Ko H Chan
(74) *Attorney, Agent, or Firm* — Dinsmore & Shohl LLP

(57) ABSTRACT

According to one embodiment, an apparatus for holding may include a plurality of ware keepers for receiving glassware. Each ware keeper may include a retention body comprising a wire coil circumscribing a glassware receiving volume. A lower-most winding of the wire coil forms a ware stop in the retention body. The retention body may include a spacer coil extending from the retention body below the ware stop. A base frame may include a plurality of apertures extending through the base frame. Each of the plurality of ware keepers may be positioned in a corresponding aperture in the base frame such that the retention body of each ware keeper is above a top surface of the base frame and the spacer coil of each ware keeper is below a bottom surface of the base frame.

16 Claims, 13 Drawing Sheets

(58) Field of Classification Search
CPC .............. B65D 71/0003; B65D 71/06; B65D 71/0007; B65D 71/70; B08B 11/02; B08B 9/42; B08B 9/423
USPC .......................................................... 211/74
See application file for complete search history.

(56) References Cited

U.S. PATENT DOCUMENTS

| | | | |
|---|---|---|---|
| 431,862 A | 7/1890 | Abrams | |
| 463,604 A | 11/1891 | Iske | |
| 492,143 A | 2/1893 | Corley | |
| 659,328 A | 10/1900 | Strauss | |
| 664,475 A | 12/1900 | Graves | |
| 827,649 A | 7/1906 | Murphy | |
| 837,224 A | 11/1906 | Holcomb | |
| 898,007 A | 9/1908 | Rowe | |
| 1,079,789 A | 11/1913 | Merker | |
| 1,117,824 A | 11/1914 | Fleming | |
| 1,264,677 A * | 4/1918 | Murrell | F16B 37/12 174/153 R |
| 1,704,472 A * | 3/1929 | Grandjean | G09F 13/26 174/138 H |
| 1,744,054 A | 1/1930 | Mosgrove | |
| 1,798,779 A | 3/1931 | Bowersock | |
| 1,800,713 A | 4/1931 | Bowersock | |
| 1,828,837 A | 10/1931 | Gagen | |
| 1,980,930 A | 11/1934 | Reyniers | |
| 2,013,240 A | 9/1935 | Harvey | |
| 2,151,192 A * | 3/1939 | Crosser | A47G 7/07 248/310 |
| 2,191,488 A | 2/1940 | McCowan | |
| 2,206,686 A | 7/1940 | Bauman | |
| 2,256,663 A | 9/1941 | Brewer | |
| 2,269,940 A | 1/1942 | Johnson | |
| 2,334,839 A | 11/1943 | Purchas | |
| 2,520,818 A | 8/1950 | Terry | |
| 2,545,416 A * | 3/1951 | Staaf | G09F 13/26 248/50 |
| 2,615,749 A | 10/1952 | Kuchel | |
| 2,760,647 A | 8/1956 | Saul, Jr. | |
| 2,802,649 A | 8/1957 | Stockton | |
| 2,805,777 A | 9/1957 | Larson | |
| 2,916,156 A | 12/1959 | Larson | |
| 2,956,686 A | 10/1960 | Garey | |
| 2,979,246 A | 4/1961 | Liebeskind | |
| 3,187,902 A | 6/1965 | Nelson | |
| 3,370,696 A | 2/1968 | Groe | |
| 3,590,752 A | 7/1971 | De Pew | |
| 3,590,863 A | 7/1971 | Faust et al. | |
| 3,613,897 A * | 10/1971 | Filler | A47F 5/0884 211/120 |
| 3,765,635 A | 10/1973 | Burrell et al. | |
| 3,768,709 A | 10/1973 | Kinard | |
| 3,780,972 A | 12/1973 | Brodersen | |
| 3,837,477 A | 9/1974 | Boudreau | |
| 4,040,234 A | 8/1977 | Stockdale et al. | |
| 4,068,798 A | 1/1978 | Rohde | |
| 4,182,455 A | 1/1980 | Zurawin | |
| 4,241,546 A | 12/1980 | Ilk | |
| 4,284,603 A | 8/1981 | Korom | |
| 4,285,449 A | 8/1981 | Campos | |
| 4,350,253 A | 9/1982 | Rusteberg | |
| 4,485,929 A | 12/1984 | Betts, Sr. | |
| 4,498,594 A | 2/1985 | Elder | |
| 4,534,465 A | 8/1985 | Rothermel et al. | |
| 4,583,647 A | 4/1986 | Schinzing | |
| 4,681,233 A | 7/1987 | Roth | |
| 4,793,548 A | 12/1988 | Ross | |
| 4,871,074 A | 10/1989 | Bryson et al. | |
| 5,036,989 A | 8/1991 | Carilli | |
| 5,148,919 A | 9/1992 | Rubin | |
| 5,169,603 A | 12/1992 | Landsberger | |
| 5,279,428 A | 1/1994 | Lee | |
| 5,346,063 A | 9/1994 | Chow | |
| 5,360,309 A | 11/1994 | Ishiguro | |
| 5,375,716 A | 12/1994 | Rubin et al. | |
| 5,384,103 A | 1/1995 | Miller | |
| 5,451,380 A | 9/1995 | Zinnanti | |
| 5,492,671 A | 2/1996 | Krafft | |
| 5,505,316 A | 4/1996 | Lee | |
| 5,544,747 A | 8/1996 | Horn | |
| 5,558,246 A | 9/1996 | Ross, Jr. | |
| 5,570,863 A * | 11/1996 | Cooper | A47G 23/0225 248/146 |
| 5,624,032 A | 4/1997 | Yucknut et al. | |
| 5,785,239 A | 7/1998 | Campbell, II et al. | |
| 5,797,675 A * | 8/1998 | Tanner, Jr. | F16L 3/13 248/50 |
| 5,843,388 A | 12/1998 | Arroyo et al. | |
| 5,888,830 A | 3/1999 | Mohan et al. | |
| 5,893,457 A | 4/1999 | Wei | |
| 5,918,751 A | 7/1999 | Kelly | |
| 5,967,340 A | 10/1999 | Kao | |
| 5,984,293 A * | 11/1999 | Abrahamson | B23Q 1/035 269/236 |
| 5,988,382 A | 11/1999 | Ritchie et al. | |
| 6,113,202 A | 9/2000 | Germano | |
| 6,132,684 A | 10/2000 | Marino | |
| 6,193,064 B1 | 2/2001 | Finneran | |
| 6,193,081 B1 | 2/2001 | Ewing | |
| 6,227,370 B1 | 5/2001 | Earnshaw et al. | |
| 6,230,888 B1 | 5/2001 | Frieze et al. | |
| 6,244,447 B1 | 6/2001 | Frieze et al. | |
| 6,257,409 B1 | 7/2001 | Lin | |
| 6,274,092 B1 | 8/2001 | Itoh | |
| 6,279,760 B1 | 8/2001 | Broeski | |
| 6,290,680 B1 | 9/2001 | Forsberg et al. | |
| 6,299,000 B1 | 10/2001 | Cabrera | |
| 6,343,690 B1 | 2/2002 | Britton et al. | |
| 6,345,723 B1 | 2/2002 | Blake et al. | |
| 6,354,543 B1 | 3/2002 | Paske | |
| 6,382,685 B1 | 5/2002 | Hammond | |
| 6,443,316 B1 | 9/2002 | Mao | |
| 6,481,583 B1 | 11/2002 | Black et al. | |
| 6,533,133 B2 | 3/2003 | Liu | |
| 6,568,544 B1 | 5/2003 | Lafond et al. | |
| 6,575,311 B1 | 6/2003 | Fink | |
| 6,832,685 B2 | 12/2004 | Chang | |
| 6,971,506 B2 | 12/2005 | Hassinen et al. | |
| 7,152,837 B1 * | 12/2006 | Babjak | F16B 45/00 24/458 |
| 7,213,592 B2 | 5/2007 | Fischhaber et al. | |
| 8,148,169 B2 | 4/2012 | Gjerde et al. | |
| 8,230,997 B2 | 7/2012 | McWilliams et al. | |
| 8,875,885 B2 | 11/2014 | Padden et al. | |
| 8,955,697 B2 | 2/2015 | Spilotro | |
| 9,403,270 B2 | 8/2016 | Lin | |
| 2002/0070185 A1 | 6/2002 | Chen | |
| 2002/0108917 A1 | 8/2002 | Maruyama | |
| 2004/0140277 A1 | 7/2004 | Comartin et al. | |
| 2005/0207945 A1 | 9/2005 | Itoh | |
| 2006/0027586 A1 | 2/2006 | Longhany et al. | |
| 2006/0198765 A1 | 9/2006 | Gjerde et al. | |
| 2007/0094924 A1 | 5/2007 | Wingerden | |
| 2008/0185352 A1 | 8/2008 | O'Hara | |
| 2010/0089938 A1 | 4/2010 | Motadel | |
| 2010/0163502 A1 | 7/2010 | Chang | |
| 2010/0258515 A1 | 10/2010 | Chen | |
| 2011/0084039 A1 | 4/2011 | Walters et al. | |
| 2011/0113974 A1 | 5/2011 | D'Amato et al. | |
| 2011/0132853 A1 | 6/2011 | Drobot et al. | |
| 2011/0200500 A1 | 8/2011 | Feilders et al. | |
| 2011/0240577 A1 | 10/2011 | Jones et al. | |
| 2011/0293942 A1 | 12/2011 | Cornejo et al. | |
| 2012/0037529 A1 | 2/2012 | Hall | |
| 2012/0051987 A1 | 3/2012 | Johnson et al. | |
| 2012/0085720 A1 | 4/2012 | Bettenhausen et al. | |
| 2012/0292273 A1 | 11/2012 | Mcnamara | |
| 2012/0305507 A1 | 12/2012 | Herchenbach et al. | |
| 2013/0171456 A1 | 7/2013 | Fadeev et al. | |
| 2013/0219965 A1 | 8/2013 | Allan et al. | |
| 2013/0277322 A1 | 10/2013 | Tiberio | |
| 2014/0093438 A1 | 4/2014 | Yanez et al. | |

(56) References Cited

U.S. PATENT DOCUMENTS

| | | |
|---|---|---|
| 2014/0112845 A1 | 4/2014 | Edens et al. |
| 2014/0166520 A1 | 6/2014 | Hoppe et al. |
| 2014/0239022 A1 | 8/2014 | Dovell |
| 2014/0305825 A1 | 10/2014 | Holley, Jr. |
| 2014/0332428 A1 | 11/2014 | Holley, Jr. |
| 2014/0332429 A1 | 11/2014 | Boersma et al. |
| 2015/0001116 A1 | 1/2015 | Schmal et al. |
| 2015/0210457 A1 | 7/2015 | DiMauro |
| 2015/0246761 A1 | 9/2015 | Holley, Jr. et al. |
| 2016/0052125 A1 | 2/2016 | Steele et al. |
| 2016/0167041 A1 | 6/2016 | Curry et al. |

FOREIGN PATENT DOCUMENTS

| | | |
|---|---|---|
| DE | 2255316 A1 | 5/1974 |
| DE | 2618522 A1 | 11/1977 |
| GB | 617777 A | 2/1949 |
| GB | 736837 A | 9/1955 |
| GB | 940041 A | 10/1963 |
| KR | 101101122 B1 | 12/2011 |

OTHER PUBLICATIONS

Notice of Allowance dated Sep. 14, 2016 for U.S. Appl. No. 14/808,728, filed Jul. 24, 2015. pp. 1-13.
International Search Report & Written Opinion dated Oct. 29, 2015 for PCT/US2015/042012 filed Jul. 24, 2015. pp. 1-9.
International Search Report & Written Opinion dated Oct. 23, 2015 for PCT/US2015/042016 filed Jul. 24, 2015. pp. 1-9.
International Search Report & Written Opinion dated Nov. 2, 2015 for PCT/US2015/042033 filed Jul. 24, 2015. pp. 1-9.
International Search Report & Written Opinion dated Oct. 29, 2015 for PCT/US2015/042007 filed Jul. 24, 2015. pp. 1-9.
Non-Final Office Action dated Feb. 23, 2017, for U.S. Appl. No. 14/808,734, filed Jul. 24, 2015. pp. 1-9.
Non-Final Office Action dated Mar. 13, 2017, for U.S. Appl. No. 14/808,702, filed Jul. 24, 2015. pp. 1-10.
Final Office Action dated May 25, 2017, for U.S. Appl. No. 14/808,734, filed Jul. 24, 2015. pp. 1-7.

* cited by examiner

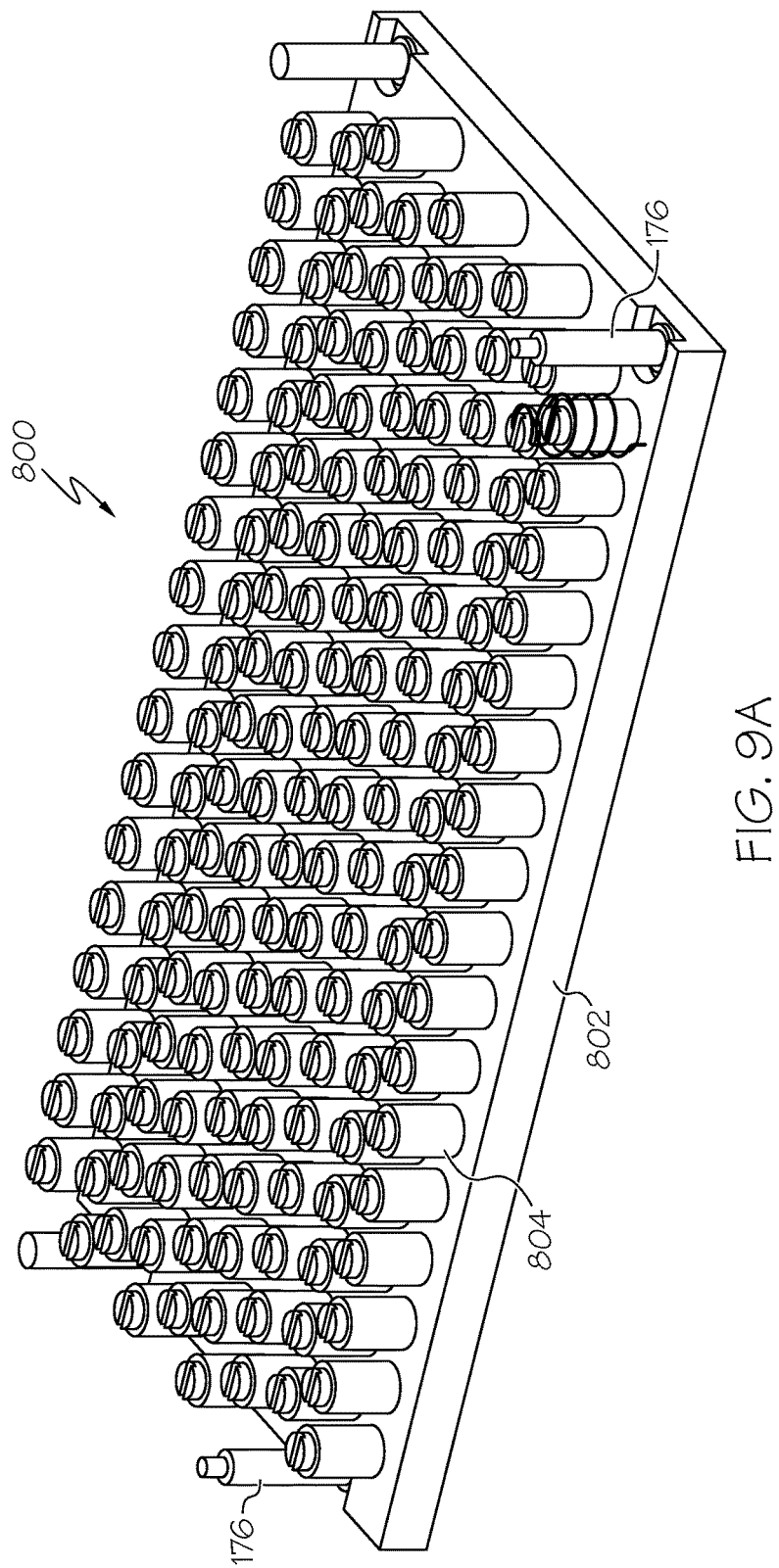

MAGAZINE APPARATUSES FOR HOLDING GLASSWARE DURING PROCESSING

CROSS REFERENCE TO RELATED APPLICATIONS

The present application claims priority to U.S. Provisional Patent Application No. 62/035,798 filed Aug. 11, 2014 entitled, "Magazine Apparatuses for Holding Glassware During Processing," the entirety of which is incorporated by reference herein.

BACKGROUND

Field

The present specification generally relates to magazine apparatuses for holding glassware during processing and, more specifically, to magazine apparatuses for holding glassware during ion exchange processing.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Accordingly, a need exists for alternative apparatuses for holding glassware during processing to mitigate glass breakage.

SUMMARY

According to one embodiment, an apparatus for holding and retaining glassware during processing may include a plurality of ware keepers for receiving glassware. Each ware keeper of the plurality of ware keepers may include a retention body comprising a wire coil circumscribing a glassware receiving volume. A lower-most winding of the wire coil has a winding diameter that is less than a winding diameter of windings in the remainder of the retention body such that the lower-most winding of the wire coil forms a ware stop in the retention body. The retention body may include a spacer coil extending from the retention body below the ware stop. A base frame may include a plurality of apertures extending through the base frame. Each of the plurality of ware keepers may be positioned in a corresponding aperture in the base frame such that the retention body of each ware keeper is above a top surface of the base frame and the spacer coil of each ware keeper is below a bottom surface of the base frame.

In another embodiment, an assembly for holding and retaining glassware during processing may include a first magazine apparatus comprising a first plurality of ware keepers for receiving glassware, wherein each ware keeper of the first plurality of ware keepers includes a retention body comprising a wire coil circumscribing a glassware receiving volume, wherein a lower-most winding of the wire coil forms a ware stop in the retention body. Each ware keeper of the first plurality of ware keepers also includes a spacer coil extending from the retention body below the ware stop. The first magazine apparatus also includes a first base frame comprising a plurality of apertures extending through the first base frame. Each of the first plurality of ware keepers is positioned in a corresponding aperture in the first base frame such that the retention body and spacer coil of each ware keeper are on opposite sides of the first base frame. The assembly also includes a second magazine apparatus comprising a second plurality of ware keepers for receiving glassware, wherein each ware keeper of the second plurality of ware keepers includes a retention body comprising a wire coil circumscribing a glassware receiving volume, a lower-most winding of the wire coil forming a ware stop in the retention body. Each ware keeper of the second plurality of ware keepers also includes a spacer coil extending from the retention body below the ware stop. The second magazine apparatus also includes a second base frame comprising a plurality of apertures extending through the second base frame. Each of the second plurality of ware keepers is positioned in a corresponding aperture in the second base frame such that the retention body and spacer coil of each ware keeper are on opposite sides of the second base frame. The second magazine is positioned atop and spaced apart from the first magazine such that the spacer coil of each ware keeper of the second plurality of ware keepers is positioned over the glassware receiving volume of a corresponding ware keeper of the first plurality of ware keepers.

Additional features and advantages of the apparatuses for holding and retaining glassware during processing described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 9A schematically depicts an assembly fixture for a magazine apparatus according to one or more embodiments described herein;

DETAILED DESCRIPTION

Figure 1:
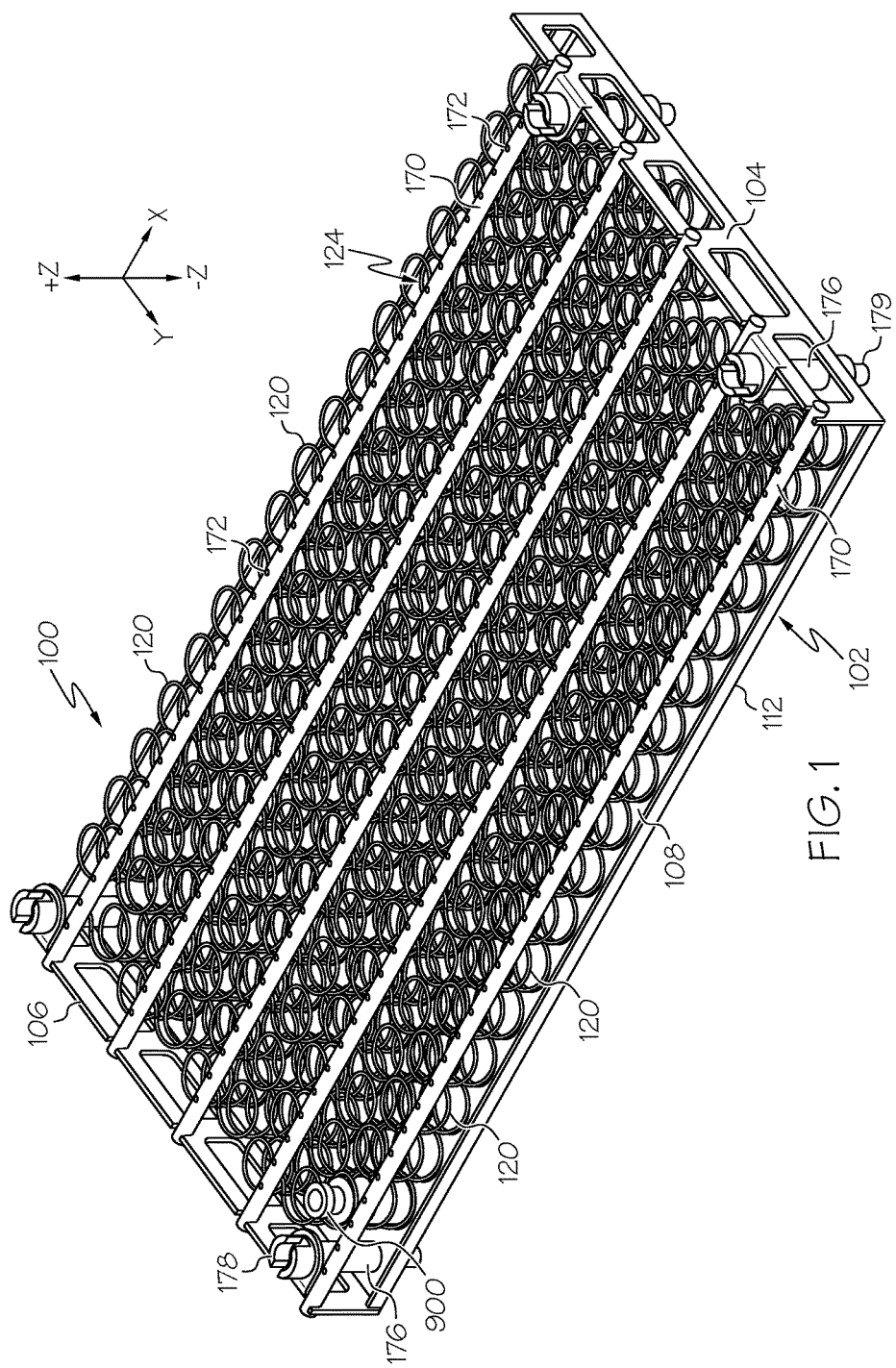
FIG. 1 schematically depicts a magazine apparatus for holding and retaining glassware during processing according to one or more embodiments shown and described herein.

Reference will now be made in detail to embodiments of magazine apparatuses for holding and retaining glassware during processing, examples of which are illustrated in the accompanying drawings. Whenever possible, the same reference numerals will be used throughout the drawings to refer to the same or like parts. One embodiment of an apparatus for holding and retaining glassware during processing is schematically depicted in FIG. 1. The magazine apparatus generally comprises a plurality of ware keepers for receiving glassware. Each ware keeper of the plurality of ware keepers may include a retention body comprising a wire coil circumscribing a glassware receiving volume. A lower-most winding of the wire coil has a winding diameter that is less than a winding diameter of windings in the remainder of the retention body such that the lower-most winding of the wire coil forms a ware stop in the retention body. The retention body may include a spacer coil extending from the retention body below the ware stop. A base frame may include a plurality of apertures extending through the base frame. Each of the plurality of ware keepers may be positioned in a corresponding aperture in the base frame such that the retention body of each ware keeper is above a top surface of the base frame and the spacer coil of each ware keeper is below a bottom surface of the base frame. Various embodiments of apparatuses for holding and retaining glassware during processing will be described in further detail herein with specific reference to the appended drawings.

As noted herein, the breakage of glassware during processing and/or filling is a source of product loss and may lead to process inefficiencies and increased costs. Strengthening of glassware can assist in mitigating breakage. Glassware can be strengthened using a variety of techniques, including chemical and thermal tempering. For example, chemical tempering can be used to strengthen glassware through the introduction of a layer of compressive stress in the surface of the glassware. The compressive stress is introduced by submerging the glassware in a molten salt bath. As ions from the glass are replaced by relatively larger ions from the molten salt, a compressive stress is induced in the surface of the glass. During chemical tempering, glassware, such as glass containers, may be mechanically manipulated to both fill and empty the glassware of molten salt.

While chemical tempering improves the strength of the glassware, mechanical manipulation of the glassware during the strengthening process may introduce flaws in the surface of the glass. For example, contact between the glassware and the fixturing used to retain the glassware during processing may introduce flaws in the glass, particularly when the glassware and the fixturing are initially submerged in the molten salt bath and/or when the fixturing and glassware are withdrawn from the molten salt bath and rotated to empty the glassware of molten salt.

Specifically, the glassware is initially placed in fixturing prior to being submerged in the molten salt bath. The fixturing is designed to retain a plurality of containers and may contain multiple trays of containers stacked on top of one another. Each container is generally held in an individual slot and retained in place with a collar situated about the neck or top of the glassware. As the fixturing with the glassware is submerged in the molten salt bath, the glassware is initially positively buoyant which causes the glassware to float upwards creating contact between the glassware and the collar. This contact between the glassware and the collar may introduce flaws into the surface of the glass. In addition, as the glassware floats upwards, contact may occur between the top of the glassware and the bottom of a tray stacked over the glassware. This contact between the glassware and the bottom of the tray stacked over the glassware may be another source of flaws.

Moreover, after the ion exchange process is complete, the fixturing and glassware are withdrawn from the molten salt bath and the fixturing is rotated to empty the glassware of molten salt contained within the interior volume of the glassware. As the fixturing is rotated, the glassware may abruptly collide with the collar situated about the neck or top of the glassware. This blunt force impact between the glassware and the collar may introduce flaws in the surface of the glass.

In most cases the flaws are superficial and are contained within the layer of surface compressive stress induced in the glass. This surface compressive stress prevents the flaws from growing into cracks. However, in extreme cases, the flaws may extend through the layer of surface compressive stress which may lead to breakage of the glassware.

In addition, fixturing used to hold and retain glassware during ion exchange processing is typically formed from metallic materials in order to be able to withstand the high temperatures of the molten salt bath. Such fixturing can have a large thermal mass which can adversely impact the ion exchange process by altering the temperature of the molten salt bath. The fixturing also tends to have a large surface area which increases the contact between the fixturing and the molten salt which can cause the ions from the molten salt to diffuse into the fixturing, degrading process performance.

The magazine apparatuses for holding and retaining glassware during processing described herein mitigate the introduction of flaws in the glassware retained therein. The magazine apparatuses described herein also have a relatively low thermal mass and surface area which mitigate the degradation of ion exchange performance when the magazine apparatuses are used to facilitate strengthening of the glassware contained therein by ion exchange.

It should be understood that the term "processing," as used herein, includes the treatment of glass articles contained within a magazine apparatus as well as the transport of glass articles while contained within the magazine apparatuses.

Referring now to FIG. 1, one embodiment of a magazine apparatus 100 for holding and retaining glassware during processing is schematically depicted. The magazine apparatus 100 generally includes a base frame 102 to which a plurality of ware keepers 120 are affixed. The ware keepers 120 generally define and circumscribe a glassware receiving volume 124 in which a piece of glassware 900, such as a glass container or the like, may be received and retained during processing. The base frame 102 is generally formed from a material capable of withstanding elevated temperatures, such as the temperatures experienced in a molten salt bath during an ion exchange process. In the embodiments described herein, the base frame 102 is formed from a metallic material such as, for example, 300 series stainless steel (304 stainless, 316 stainless, 316L stainless), nickel, or nickel-based alloys. The base frame 102 includes a plurality of apertures 110 (labeled in FIG. 4). The ware keepers 120 are positioned in corresponding apertures such that a portion of each ware keeper 120 is below a bottom surface 112 of the base frame 102 and a portion of each ware keeper 120 is above the top surface 108 of the base frame 102, as will be described in further detail herein.

The base frame 102 may also include side supports 104, 106 located at opposite ends of the base frame 102 in a length direction (i.e., the +/−X direction of the coordinate axes depicted in FIG. 1). The side supports 104, 106 generally extend above the top surface 108 of the base frame 102. For example, in some embodiments, the side supports 104, 106 may be generally perpendicular to the top surface 108 of the base frame 102. However, it should be understood that the side supports 104, 106 need not be perpendicular to the top surface 108 of the base frame 102. For example, the side supports 104, 106 may be at an angle of less than or greater than 90 degrees with respect to the top surface 108 of the base frame 102 so long as the side supports 104, 106 generally extend above the top surface 108 (i.e., the +Z direction of the coordinate axes depicted in FIG. 1). The side supports 104, 106 may be integrally formed with the base frame 102 or attached to the base frame 102 using conventional fastening techniques including, without limitation, mechanical fasteners, welding, or the like.

In the embodiments described herein, the side supports 104, 106 are utilized to support a plurality of support rods 170 above the top surface 108 of the base frame 102. The support rods 170 are used to fix and stabilize the ware keepers 120. In the embodiment of the magazine apparatus 100 depicted in FIG. 1, the ends of the support rods 170 are received in slots formed in the side supports 104, 106 and secured to the side supports 104, 106 by welding. However, in alternative embodiments, the support rods 170 may be secured to the side supports 104, 106 with mechanical fasteners, such as screws and/or bolts. The support rods 170 may be formed from materials suitable for use at elevated temperatures. For example, in the embodiments described herein, the support rods 170 may be formed from a metallic material such as, for example, 300 series stainless steel (304 stainless, 316 stainless, 316L stainless), nickel, or nickel-based alloys.

Figure 2:
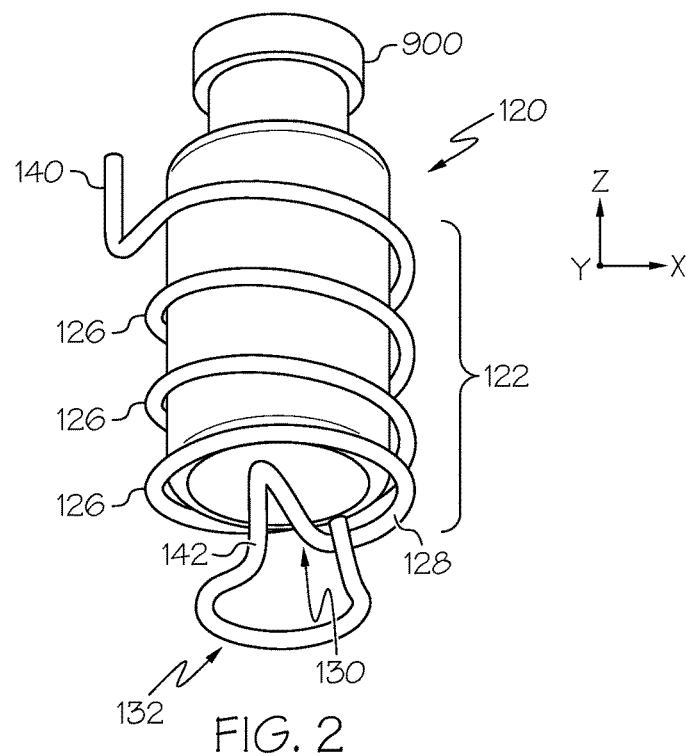
FIG. 2 schematically depicts one embodiment of a ware keeper for use with the magazine apparatus of FIG. 1.
Figure 3:
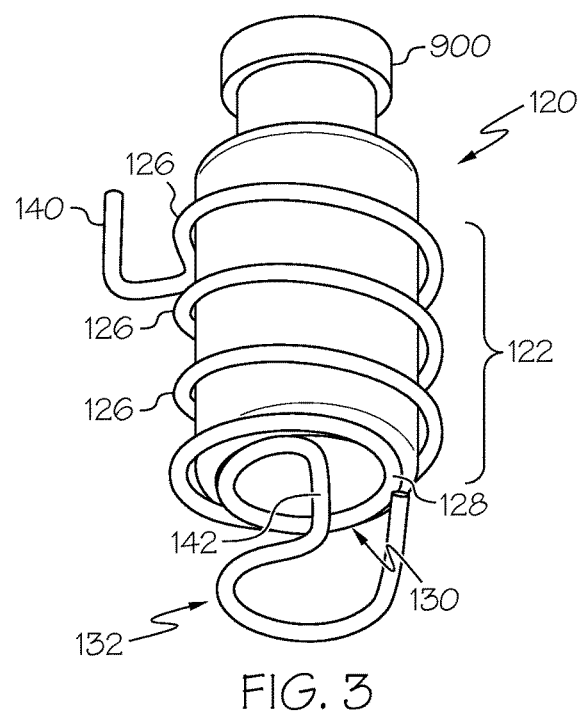
FIG. 3 schematically depicts another embodiment of a ware keeper for use with the magazine apparatus of FIG. 1.

Referring now to FIGS. 1-3, the ware keepers 120 are formed from a wire coil which comprises a plurality of windings 126 with different diameters such that each ware keeper 120 has a retention body 122 and a spacer coil 132. Forming the ware keepers 120 from a wire coil reduces the overall amount of material in the magazine apparatus 100 which, in turn, reduces both the thermal mass and surface area of the magazine apparatus 100 thereby improving ion exchange performance. In addition, forming the ware keepers 120 from a wire coil creates a basket-like open structure which allows molten salt from a molten salt bath to readily interact with all surfaces of the glass container when the magazine apparatus 100 is submerged while also allowing the magazine apparatus 100 to be easily drained of molten salt upon extraction from the molten salt bath. Also, forming the ware keepers 120 from a wire coil allows the keepers to have some compliance which limits the amount of force imparted on the glass ware surface and reduces the possibility of inducing flaws. In the embodiments described herein, the ware keepers 120 are formed from wire stock which is free from corners and/or edges that can introduce flaws in glass. In particular, the ware keepers 120 are formed from wire stock which is substantially circular or oval in radial cross section. While various diameters of wire stock may be used to form the ware keepers 120, the diameter of the wire stock is generally less than about 5 mm, such as less than about 2.5 mm, less than about 2.0 mm, less than about 1.3 mm or even less than or equal to about 1 mm. In the embodiments described herein the ware keepers are formed from wire stock which is suitable for use at elevated temperatures. For example, the ware keepers may be formed from a metallic material such as, for example, 300 series stainless steel (304 stainless, 316 stainless, 316L stainless), nickel, or nickel-based alloys. In the embodiments described herein, the wire stock is formed into the desired shape using a computer-numeric-control (CNC) wire bending machine or a similar apparatus for forming wire stock into a desired shape.

As noted above, the ware keepers 120 comprise a retention body 122 which is formed from a portion of the wire coil. The wire coil of the retention body 122 is formed such that adjacent windings 126 of the wire coil are spaced apart from one another in the axial direction (i.e., the +/−Z direction) of the ware keeper 120. As such, the wire coil of the retention body 122 defines and circumscribes a glassware receiving volume in which a piece of glassware may be positioned. The ware keepers 120 depicted in FIGS. 2 and 3 are shown with glassware 900 positioned in the glassware receiving volume. In the embodiments described herein, the winding diameter of the windings 126 (i.e., the inner diameter of the windings) of the wire coil which make up the retention body 122 are slightly larger than the outer diameter of the glassware 900 such that the glassware 900 may be easily inserted and removed from the glassware receiving volume without scuffing the external surface of the glassware 900 through contact with the windings.

The lower portion of the retention body 122 includes a ware stop 130 that extends from the wire coil forming the retention body 122. The ware stop 130 acts as a seat in the glassware receiving volume of the retention body 122 upon which glassware 900 positioned in the glassware receiving volume rest. In embodiments, the ware stop 130 is formed by shaping the lower-most winding 128 of the wire coil forming the retention body 122 such that the winding diameter of the lower-most winding 128 is less than the winding diameter of the windings 126 in the remainder of the retention body 122. For example, in the embodiment of the ware keeper 120 depicted in FIG. 2, the winding diameter of the lower-most winding 128 is decreased relative to the preceding winding 126. In this embodiment, at least a portion of the lower-most winding 128 may be substantially linear and extend at least partially across an area circumscribed by the preceding winding 126 of the retention body 122, as depicted in FIG. 2. Alternatively, the winding diameter of at least a portion of the lower-most winding 128 may be progressively decreased relative to the preceding winding 126, such that the lower-most winding 128 is positioned within the area circumscribed by the preceding winding 126 of the retention body 122, as depicted in FIG. 3. Forming the lower-most winding 128 such that a winding diameter of at least a portion of the lower-most winding 128 decreases provides a ware stop 130 with increased contact area, thereby spreading the contact forces between the ware keeper 120 and the glassware 900 over a larger area.

The upper portion of the retention body 122 further includes a retention stem 140 that extends from the wire coil forming the retention body 122. The retention stem 140 is engageable with a corresponding bore 172 (FIGS. 1 and 4) formed in a support rod 170. In the embodiments described herein, the retention stem 140 extends from the wire coil forming the retention body 122 in a substantially vertical direction (i.e., in the +Z direction of the coordinate axes depicted in FIGS. 2 and 3). However, it should be understood that, in alternative embodiments, the retention stem 140 may be at an angle with respect to vertical. Engaging the retention stem 140 of the ware keeper 120 with a support rod 170 assists in stabilizing the ware keeper 120 on the base frame 102 and maintaining the spacing between adjacent ware keepers. The retention stem 140 may be welded to the support rod at the top of the support rod to further stabilize the ware keeper 120. Maintaining the relative spacing between adjacent ware keepers also assists in the automated loading and unloading of glassware 900 into the glass receiving volume of each ware keeper 120.

Still referring to FIGS. 1-3, each of the ware keepers 120 also includes a spacer coil 132 which extends from the lower portion of the retention body 122. In embodiments, the spacer coil 132 has a winding diameter which is less than or equal to the winding diameter of the windings 126 of the wire coil of the retention body 122. The spacer coil 132 is spaced apart from the retention body 122 by a spacer stem 144 which extends from the lower-most winding 128. In the embodiments described herein, the spacer stem 144 generally extends in the vertical direction (i.e., in the +Z direction of the coordinate axes depicted in FIGS. 2 and 3). However, it should be understood that, in alternative embodiments, the spacer stem 144 may be at an angle with respect to vertical. As will be described in further detail herein, the spacer coil acts as a spring cushion which slows and arrests the advance of glassware from an adjacent magazine apparatus towards the underside of the magazine apparatus, thereby preventing damage to the glassware.

Figure 4:
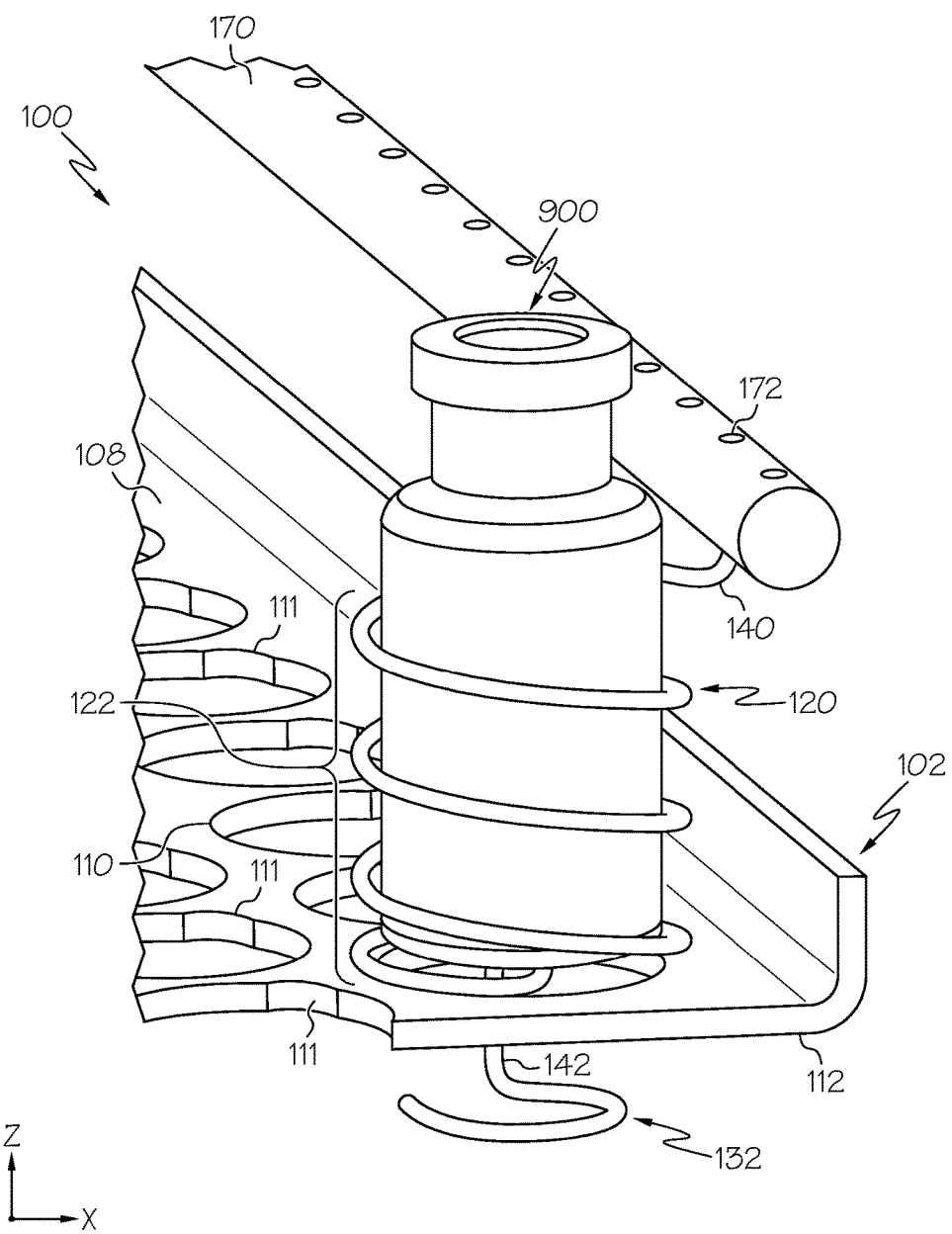
FIG. 4 schematically depicts the engagement of a ware keeper with a base frame and a support plate according to one or more embodiments shown and described herein.

Referring now to FIG. 4, a portion of a magazine apparatus 100 is schematically depicted. As shown in FIG. 4, when the ware keeper 120 is positioned in an aperture 110 of the base frame 102, a portion of the ware keeper 120 is below a bottom surface 112 of the base frame 102 and a portion of the ware keeper 120 is above the top surface 108 of the base frame 102. More specifically, the ware keeper 120 is positioned in the aperture 110 such that at least a portion of the retention body 122 is positioned on or above the top surface 108 of the base frame 102 and the spacer coil 132 is positioned below the bottom surface 112 of the base frame 102. For example, in the embodiment depicted in FIG. 4, the ware keeper 120 is positioned in the aperture 110 such that the retention body 122 is positioned over the top surface 108 of the base frame 102 with the spacer stem 142 extending through the aperture 110 such that the spacer coil 132 is positioned below and spaced apart from the bottom surface 112 of the base frame 102. In this particular embodiment, the retention body 122 is fixed to the base frame 102, such as by welding or the like, and the retention stem 140 is engaged with a corresponding bore 172 formed in the support rod 170, thereby fixing the position of the ware keeper 120 with respect to the base frame. In the embodiments described herein, the apertures 110 include side channels 111 which may be used to facilitate attaching the ware keepers 120 to the base frame 102

Figure 10:
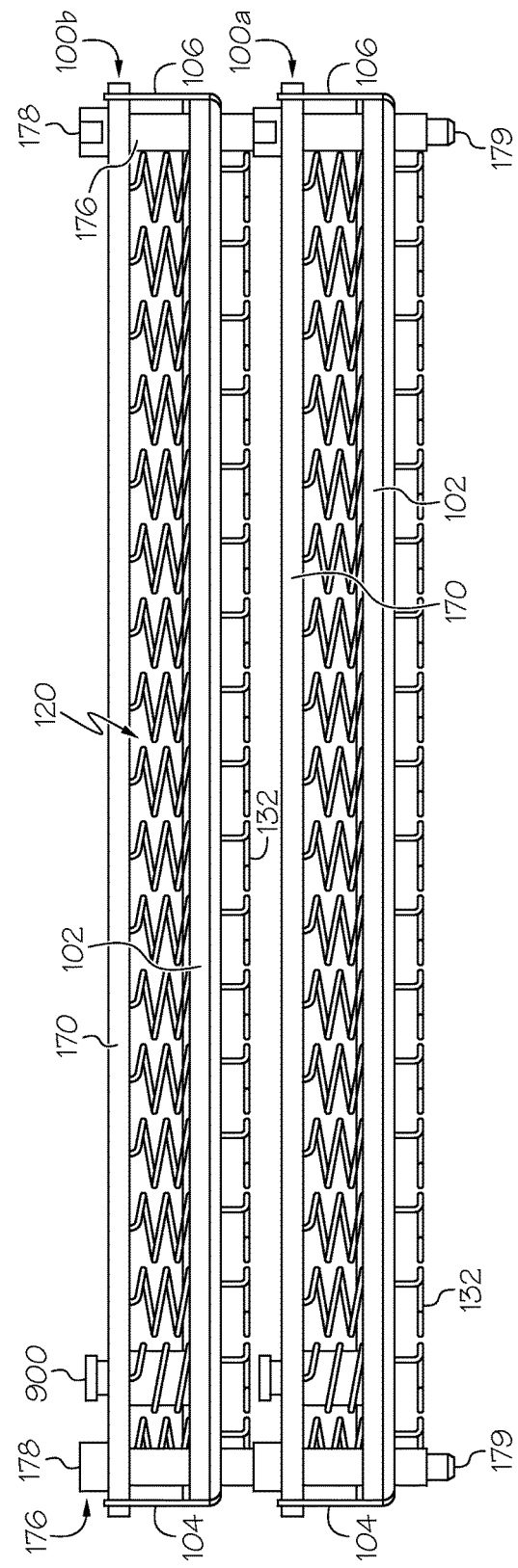
FIG. 10 schematically depicts a side view of a pair of magazine apparatus stacked one atop the other with support legs spacing the magazine apparatuses apart.

Referring now to FIGS. 1 and 10, in the embodiments described herein, the magazine apparatus 100 may further comprise at least one stand-off 176 extending from at least one of the top surface and the bottom surface of the base frame 102. The magazine apparatus 100 depicted in FIG. 1 includes a plurality of stand-offs 176 positioned near the ends of the base frame 102 in the length-wise direction of the support frame (i.e., in the +/−X direction of the coordinate axes depicted in FIG. 1). However, it should be understood that the stand-offs 176 may extend from both the top surface 108 and bottom surface 112 of the base frame 102. The stand-offs 176 are utilized to stack a plurality of magazine apparatuses 100 one atop the other while maintaining separation between the base frames of adjacent magazine apparatuses, as depicted in FIG. 10 where magazine apparatus 100b is stacked atop magazine apparatus 100a. For example, in one embodiment, the stand-offs 176 may extend through the base frame 102 with each stand-off comprising a socket 178 on one end of the stand-off 176 and a post 179 on the other end of the stand-off 176. In the embodiment shown in FIG. 1, the stand-offs each include a socket 178 in an upper end of the stand-off and a post 179 on a lower end of the stand-off 176. However, it should be understood that, in other embodiments, the upper end of the stand-off may include the post 179 and the lower end may include the socket 178. The socket 178 is sized and shaped to receive a corresponding post 179 from a stand-off of an adjacent magazine apparatus, such as a magazine apparatus positioned above or below depending on the configuration of the stand-off 176, thereby maintaining a desired spacing there between and preventing relative motion in the lateral direction (i.e., motion in the X-Y plane of the coordinate axes depicted in FIG. 1). In embodiments, the stand-offs 176 are sized such that a spacing between the base frame of the magazine apparatus above and the base frame of the magazine apparatus below is greater than a height of the retention body of the ware keepers from the top surface of the ware frame of the magazine apparatus below. For example, in one embodiment, the spacing between the top surface of the base frame of a magazine apparatus below and the bottom surface of the base frame of a magazine apparatus above less the spacing of the spacer coils from the bottom surface of the base frame of the magazine apparatus above is greater than or equal to a height of the retention body of each ware keeper from the top surface of the base frame of the magazine apparatus below, as depicted in FIG. 10. Sizing the stand-offs 176 in this manner allows glassware to be positioned in the ware keepers 120 without the glassware directly contacting the spacer coils of the magazine apparatus above, thereby preventing the spacer coils from scuffing the glassware. In embodiments, the stand-offs may be formed from a metallic material such as, for example, 300 series stainless steel (304 stainless, 316 stainless, 316L stainless), nickel, or nickel-based alloys.

Figure 5:
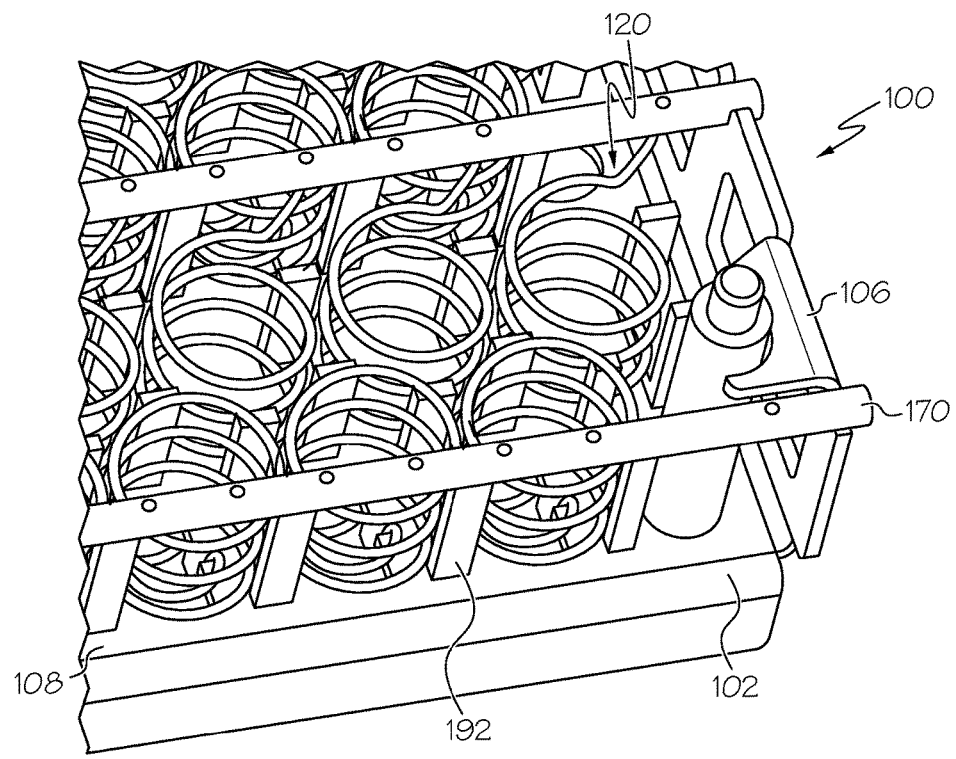
FIG. 5 schematically depicts an isometric top view of a magazine apparatus with a locking plate, according to one or more embodiments shown and described herein.
Figure 7:
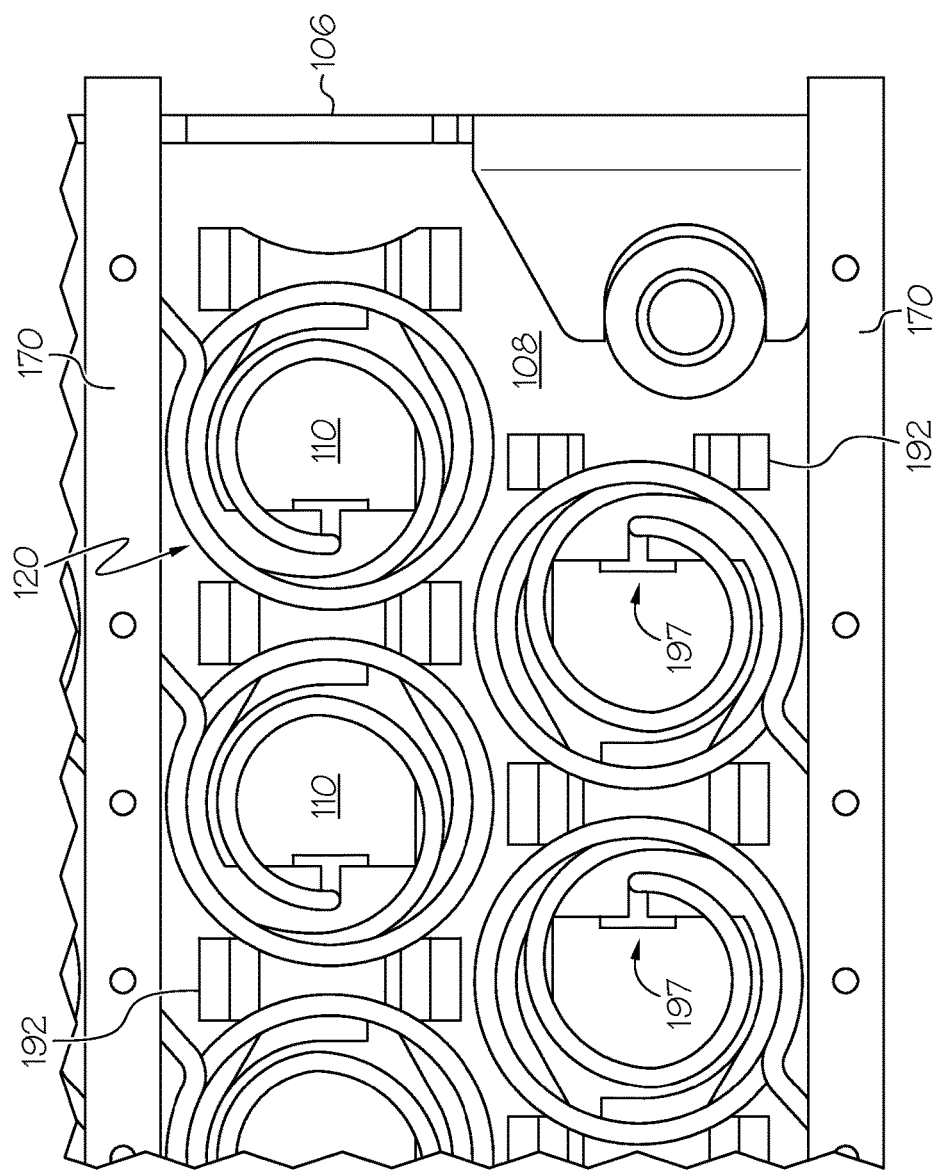
FIG. 7 schematically depicts a top view of a magazine apparatus with a locking plate according to one or more embodiments described herein.
Figure 8:
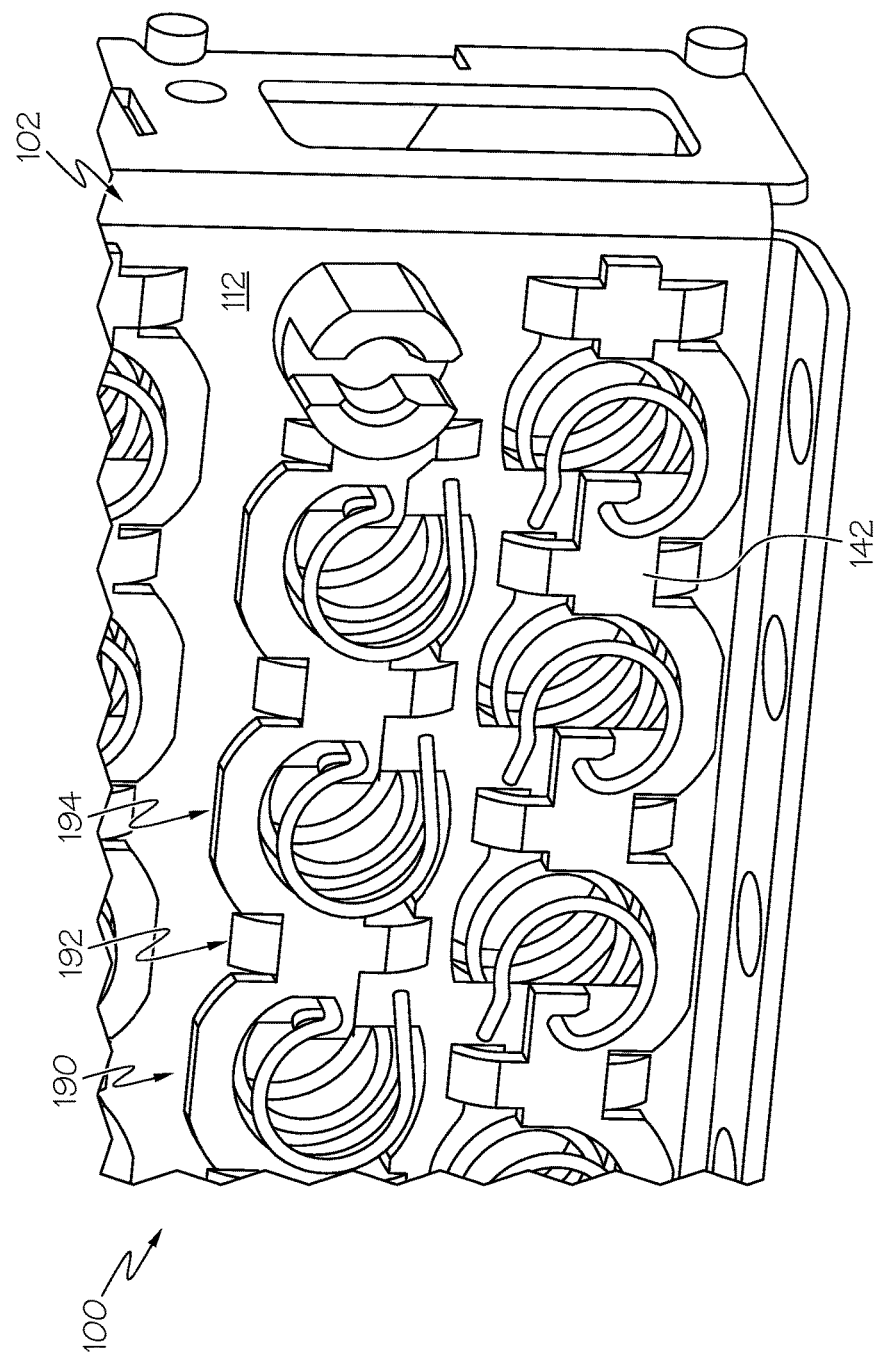
FIG. 8 schematically depicts an isometric bottom view of a magazine apparatus with a locking plate according to one or more embodiments described herein.

Referring now to FIGS. 5 and 7, in some embodiments, the magazine apparatus 100 may further comprise a plurality of support legs 192 positioned between adjacent ware keepers 120. In embodiments, the support legs 192 extend from the top surface 108 of the base frame 102 and may be substantially perpendicular to the top surface 108 of the base frame 102. The support legs 192 are spaced apart from the ware keepers 120 and form a cage-like structure around the ware keepers 120. This allows the ware keepers 120 to remain flexible and compliant while preventing the ware keepers from being plastically deformed due to improper handling.

Figure 6:
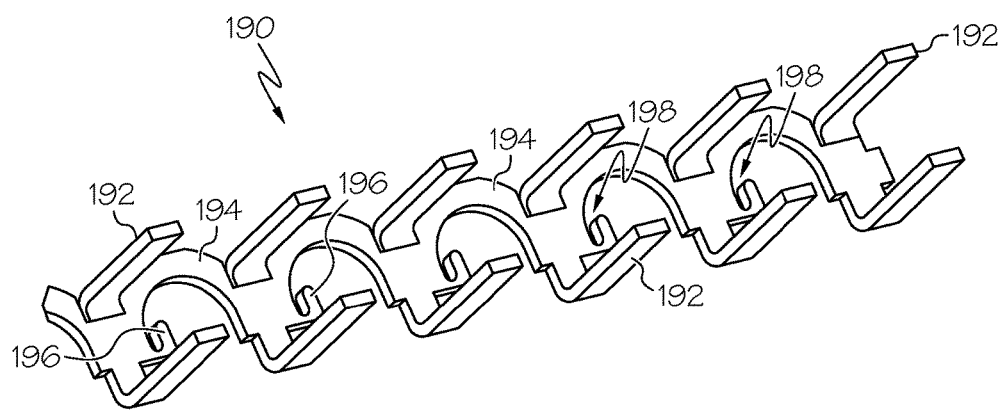
FIG. 6 schematically depicts a locking plate for use with a magazine apparatus according to one or more embodiments described herein.

Referring now to FIGS. 5 and 6, in embodiments, the support legs 192 are part of a locking plate 190 which is affixed to the base frame 102 of the magazine apparatus 100. In embodiments, the locking plate 190 is formed with a plurality of segments 194 which, in embodiments, may have a circular or semi-circular configuration, as depicted in FIG. 6. Each of the segments 194 generally corresponds to an aperture 110 in the base frame 102 of the magazine apparatus 100. As such, it should be understood that the support legs 192 are positioned between adjacent segments 194 of the locking plate 190. Each segment 194 of the locking plate 190 may further include a finger 196 which extends into the area circumscribed by the segment. In embodiments, the finger 196 is shaped to form a locking slot 198 between the finger 196 and the segment 194. The locking slot 198 generally has a slot direction which, as used herein, refers to the direction of the long axis of the slot. In the embodiment of the locking plate 190 depicted in FIG. 6, the fingers 196 are generally L-shaped and extend from the segments 194 such that the locking slot 198 is formed between the long leg of the "L" and the segment 194. However, it should be understood that other configurations of the finger 196 are contemplated and possible. In the embodiments described herein, the locking slots 198 are generally sized to receive a portion of a corresponding ware keeper 120. In embodiments, the locking plate may be formed from a metallic material such as, for example, 300 series stainless steel (304 stainless, 316 stainless, 316L stainless), nickel, or nickel-based alloys.

Referring now to FIGS. 5-8, the locking plate 190 may be attached to the bottom surface 112 of the base frame 102, such as by welding or fasteners, such that the segments 194 are generally aligned with corresponding apertures 110 of the base frame 102 and the support legs 192 are positioned in openings (not shown) in the base frame 102 such that the support legs 192 extend from the top surface 108 of the base frame 102, as described above. In the embodiments of the magazine apparatus 100 described herein which utilize locking plates 190, each aperture of the base frame 102 includes a datum slot 197. Each datum slot 197 generally has a slot direction which, as used herein, refers to the direction of the long axis of the slot. Like the locking slots 198, the datum slots 197 are generally sized to receive a portion of a corresponding ware keeper 120 and, more specifically, the spacer stem 142 of the ware keeper 120 which couples the spacer coil 132 to the retention body 122. When the locking plate 190 is positioned on the base frame 102 and the segments 194 are aligned with the corresponding apertures 110 in the base frame, the locking slots 198 and corresponding datum slots 197 overlap and the slot directions of the locking slots 198 are rotationally offset from the slot direction of the corresponding datum slots 197. For example, in embodiments, the slot direction of the locking slots 198 are rotationally offset from the slot direction of the datum slots 197 by an angle of greater than 0 degrees to less than or equal to 180 degrees. This orientation between the locking slots 198 and datum slots 197 locks the spacer stems 142 of the ware keepers 120 engaged with both the locking slots 198 and the corresponding datum slots 197 into position on the base frame 102 thereby securing the ware keepers 120 to the base frame 102 and preventing disengagement of the ware keeper 120 from the base frame 102.

Figure 9B:
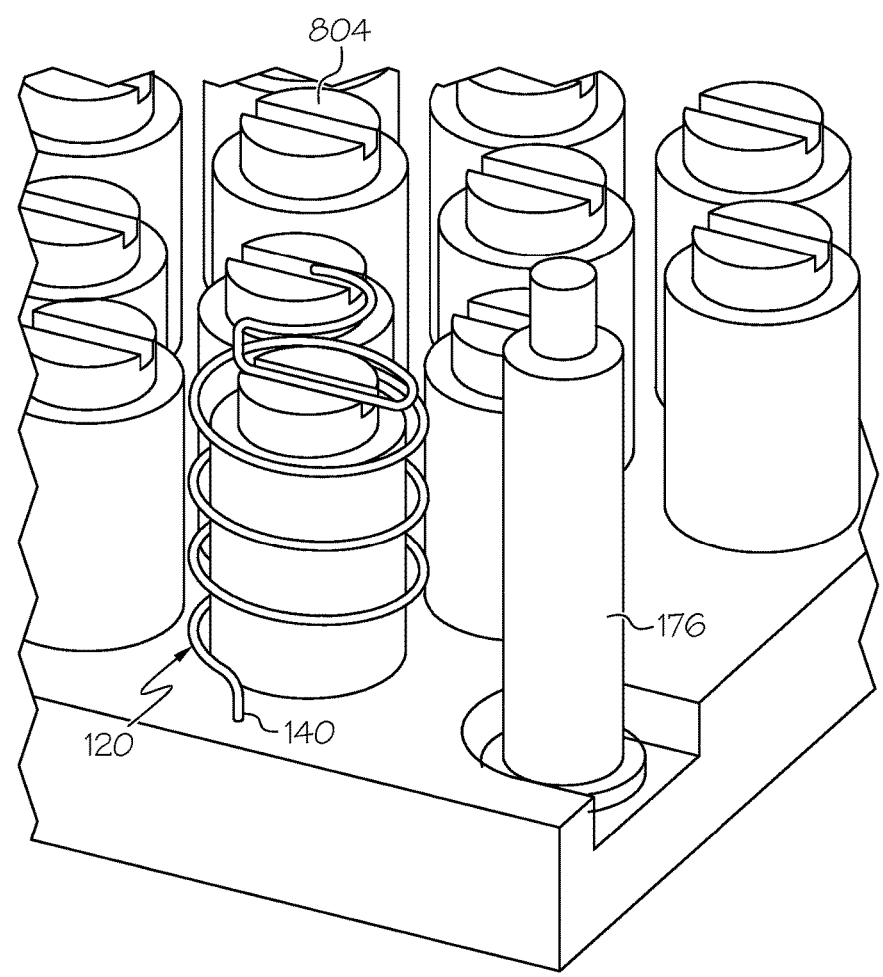
FIG. 9B schematically depicts a close-up view of a ware keeper positioned on a locating pin of the assembly fixture of FIG. 9A.
Figure 9C:
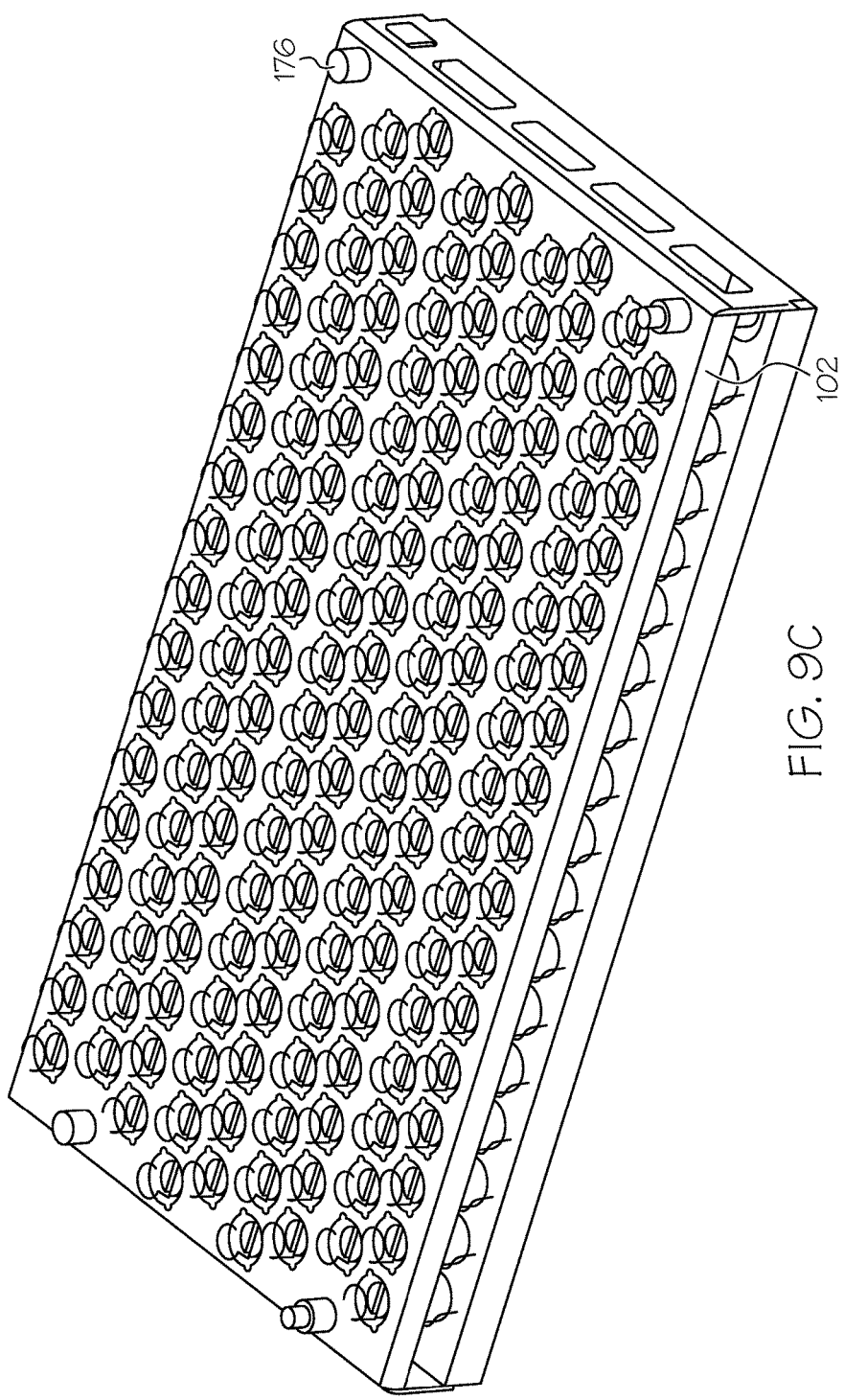
FIG. 9C schematically depicts a base frame of a magazine apparatus positioned on the locating pins of the assembly fixture of FIG. 9A.

Referring now to FIGS. 9A-9C, one embodiment of an assembly fixture 800 for assembling a magazine apparatus, such as the magazine apparatus 100 shown in FIG. 1, is schematically depicted. The assembly fixture 800 includes a base 802 to which a plurality of registration pins 804 are attached. The registration pins 804 are sized to fit within the glassware receiving volume of a ware keeper and are spaced to correspond to the apertures formed in the base frame 102 of the magazine apparatus. In embodiments, the base 802 further comprises holes for receiving the stand-offs 176 at the end of the base 802 and holes for receiving the retention stem 140 of each ware keeper 120. In embodiments, the registration pins 804 may further include slots for receiving the ware stops 130 of the ware keepers 120. These holes and slots allow for the stand-offs 176 and ware keepers 120 to be precisely oriented during assembly.

In use, the ware keepers 120 are first positioned on the registration pins 804 and oriented such that the retention stem 140 of each ware keeper is engaged in a corresponding hole in the base 802 to properly orient the ware keeper, as shown in FIGS. 9A and 9B. Similarly, the stand-offs 176 are engaged with corresponding holes in the base 802. Thereafter, the base frame 102 is positioned on the assembly fixture such that the registration pins 804 are engaged with the apertures 110 in the base frame 102, as depicted in FIG. 9C, and the stand-offs 176 are engaged with corresponding apertures in the base frame 102. With the base frame in this orientation, the spacer coils of the ware keepers 120 are located adjacent to the bottom surface of the base frame and the retention bodies of the ware keepers 120 are located adjacent to the top surface of the base frame. The ware keepers 120 and stand-offs 176 are then welded to the base frame 102. In one embodiment, the ware keepers 120 may be welded to the base frame 102 in the side channels 111 extending from the apertures 110 in the base frame 102 (FIG. 4). Once the ware keepers 120 are welded in place, the base frame with attached ware keepers 120 and stand-offs 176 is removed from the assembly fixture and the support rods (FIG. 1) are attached to the base frame 102 such that the retention stems 140 of the ware keepers 120 are engaged with corresponding bores in the support rods. In another embodiment, grooves may be machined into the base 802 to accept the support rods. The retention stems can then be placed directly into the support rods, and the ends of the support rods can be welded to the base frame before removing the assembly from the fixture.

Figure 11:
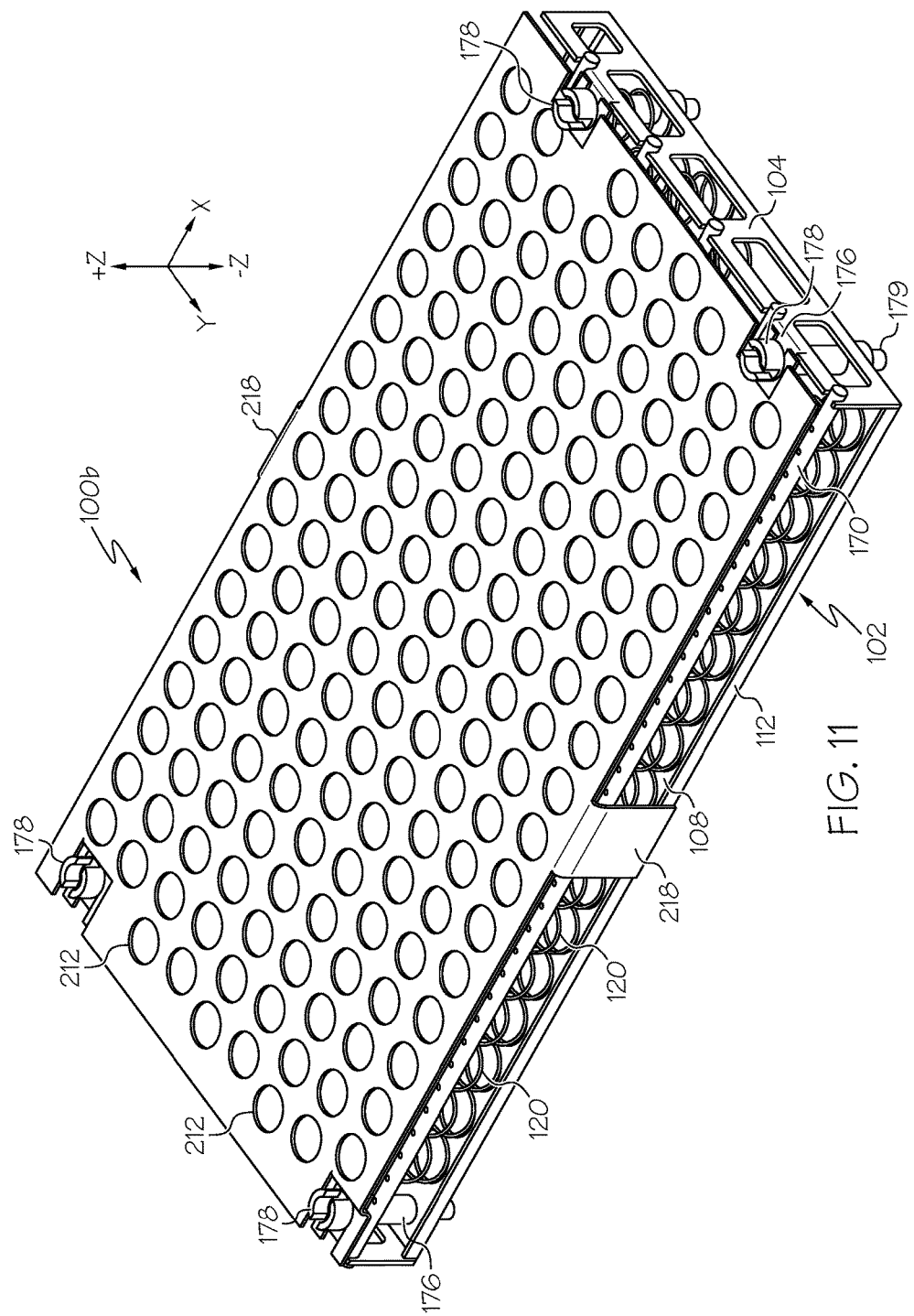
FIG. 11 schematically depicts a magazine apparatus with a cover plate attached thereto, according to one or more embodiments shown and described herein.
Figure 12:
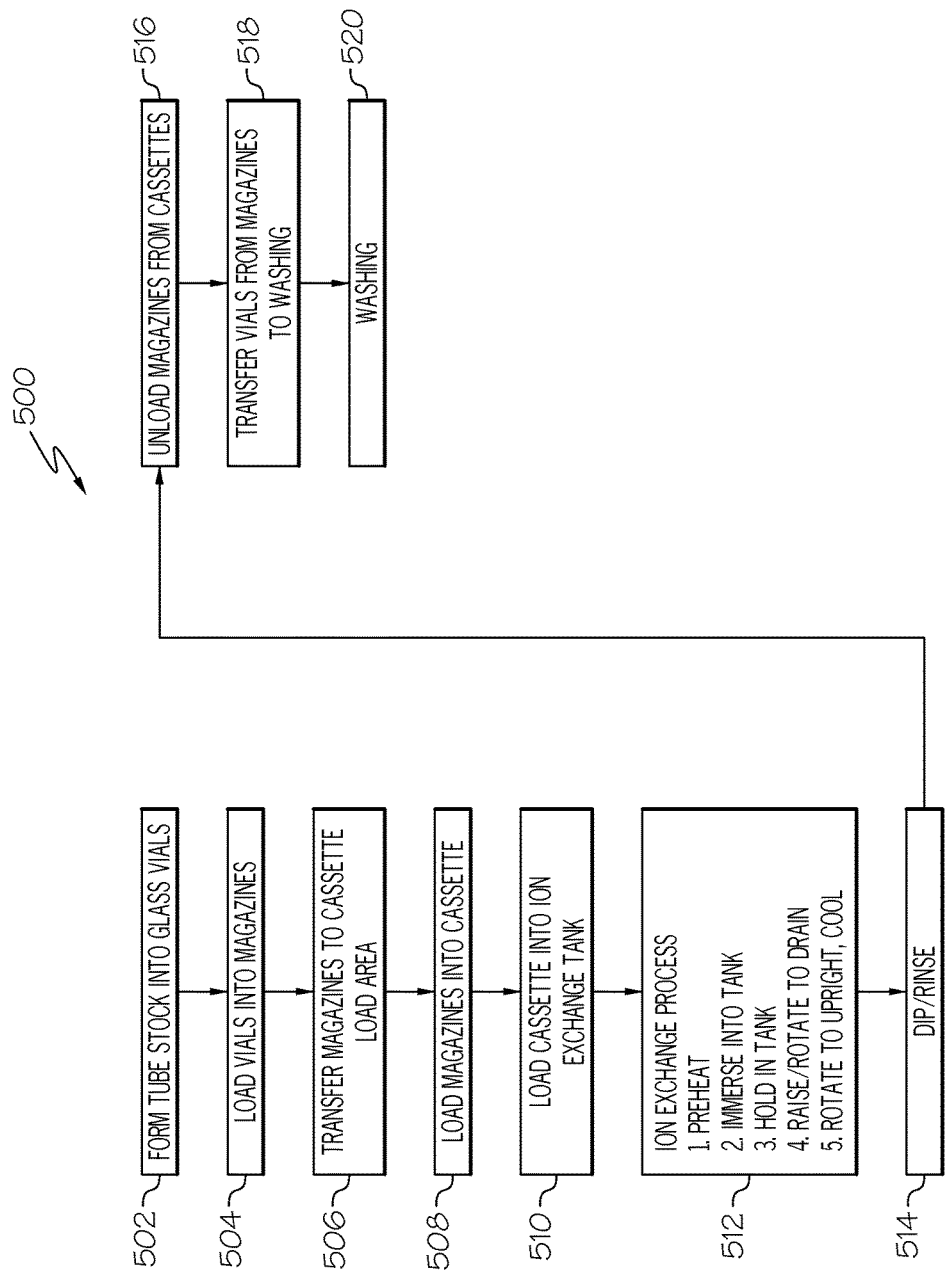
FIG. 12 is a flow diagram of a method for ion exchange strengthening glassware with the magazine apparatuses described herein.

Referring now to FIGS. 10 and 11, in embodiments, the upper magazine apparatus 100b of a stack of magazine apparatuses may further comprise a cover plate 210 positioned over top of the magazine apparatus. The cover plate 210 holds glass articles in the ware keepers of the upper magazine apparatus 100b as the stack of magazine apparatuses are manipulated through various processing steps, such as ion exchange processing, washing, rinsing, and the like. The cover plate 210 is constructed from a material suitable to withstand repeated cycling to high temperatures, such as the temperatures experienced in a conventional ion exchange operation (i.e., temperatures in excess of 300° C.), without loss of mechanical integrity. For example, in one embodiment, the cover plate 210 may be formed from a stainless steel material such as, for example, 300 series stainless steel (304 stainless, 316 stainless, 316L stainless), nickel, or nickel-based alloys.

In embodiments, the cover plate 210 is constructed to minimize its thermal mass. For example, in embodiments, the cover plate 210 may be constructed from thin sheets of material such that the cover plate 210 has a thickness of less than or equal to 0.05 inch (1.27 mm) or even less than or equal to 0.03 inch (0.762 mm). In still other embodiments, the cover plate 210 may be constructed from a thin sheet of material such that the cover plate has a thickness of less than or equal to 0.02 inch (0.508 mm) or even less than or equal to 0.015 inch (0.381 mm). Forming cover plate 210 from a thin sheet of material reduces the overall thermal mass of the magazine apparatus 100 while providing structural rigidity to the magazine apparatus 100.

The cover plate 210 may include a plurality of openings 212 which extend through the thickness of the cover plate 210. The openings 212 allow for fluid, such as molten salt and/or water, to pass through the cover plate 210 and enter the glass articles positioned in the ware keepers 120, when the magazine apparatus 100b is submerged in the fluid. The openings 212 also allow for the fluid to rapidly drain from the magazine apparatus 100b when the magazine apparatus 100b is withdrawn from the fluid. In addition, the openings decrease the thermal mass of the magazine apparatus 100b, lessening the thermal impact the magazine apparatus 100 has on the ion exchange bath as it is lowered into the bath. In embodiments, the openings 212 may be of uniform size and shape and are regularly positioned over the surface of the cover plate 210. In some other embodiments, the openings may be formed with different sizes and/or shapes.

In some embodiments, the cover plate 210 may include a plurality of locating channels 214. These locating channels 214 may be positioned to engage with the sockets 178 of the standoffs 176 in order to properly orient the cover plate 210 on the magazine apparatus 100b. The cover plate 210 may also include an attachment clip 218 which engages with the magazine apparatus 100b to retain the cover plate 210 atop the magazine apparatus 100b. In embodiments, the attachment clip 218 may be an elastically deformable and recoverable clip attached to, or integrally formed with, the cover plate 210. The attachment clip 218 may engage with the base frame 102 of the magazine apparatus, as depicted in FIG. 11, or, alternatively, with the support rods.

Figure 13:
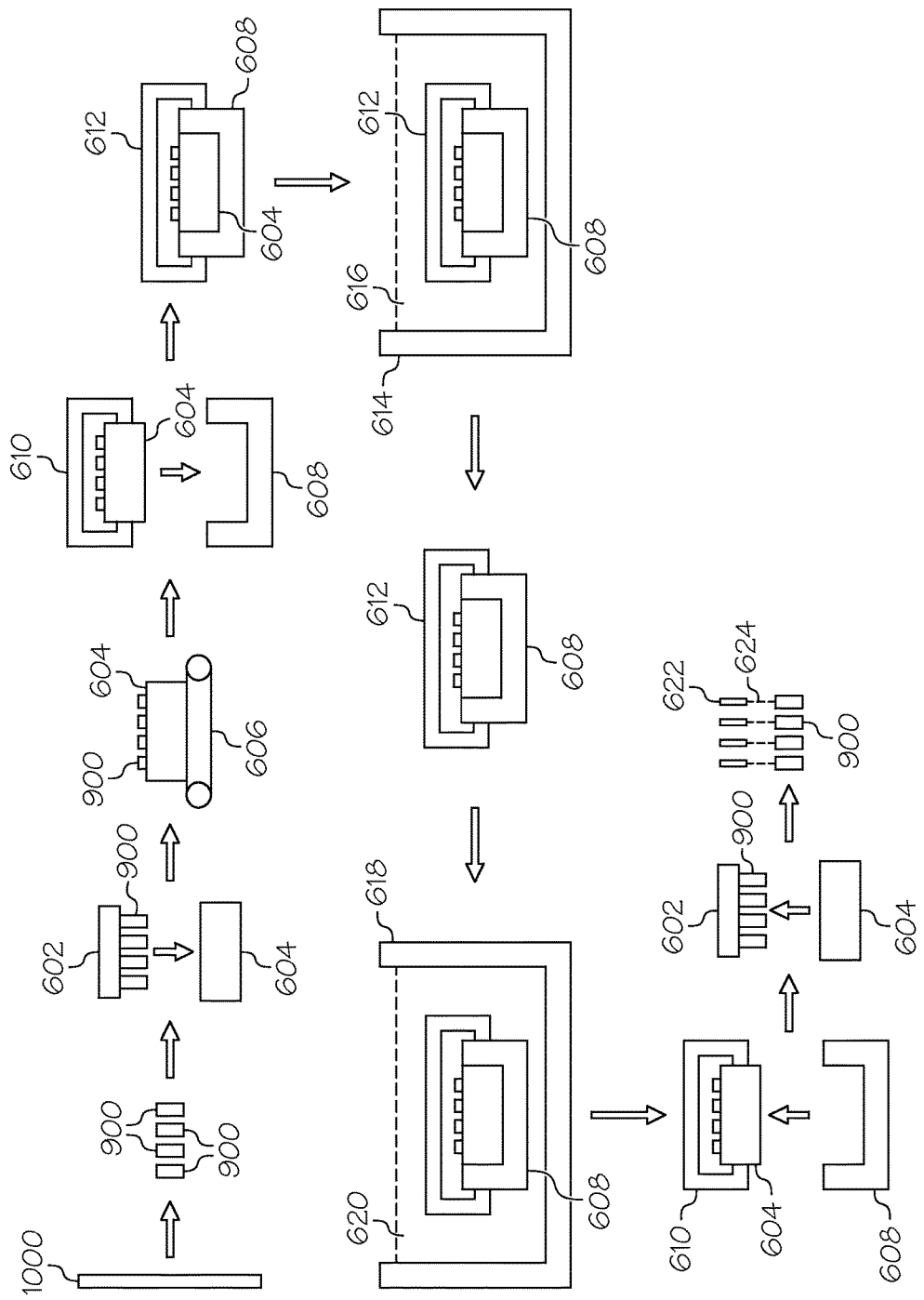
FIG. 13 schematically depicts the method steps of the flow diagram of FIG. 12.

Referring collectively to FIGS. 1 and 10-13, FIG. 12 contains a process flow diagram 500 of a method for strengthening glassware by ion exchange and FIG. 13 schematically depicts the process described in the flow diagram. In a first step 502, glass tube stock 1000 formed from an ion-exchangeable glass composition is initially shaped into glassware 900 (specifically glass vials in the embodiment depicted) using conventional shaping and forming techniques. In step 504, the glassware 900 are loaded into magazine apparatuses 100 using a mechanical magazine loader 602. The magazine loader 602 may be a mechanical gripping device, such as a caliper or the like, which is capable of gripping multiple pieces of glassware at one time. Alternatively, the gripping device may utilize a vacuum system to grip the glassware 900. The magazine loader 602 may be coupled to a robotic arm or other, similar device capable of positioning the magazine loader 602 with respect to the glassware 900 and the magazine apparatus 100. The magazine loader 603 positions individual pieces of glassware 900 in the glassware receiving volume of each ware keeper 120 such that the glassware is positioned in the retention body 122 resting on the ware stop 130 of the ware keeper 120.

In a next step 506, the magazine apparatus 100 loaded with glassware 900 is transferred with a mechanical conveyor, such as a conveyor belt 606, overhead crane or the like, to a cassette loading area. Thereafter, in step 508, a plurality of magazine apparatuses 100 (one depicted) are loaded into a cassette 608. While only one magazine apparatus 100 is depicted in FIG. 13, it should be understood that the cassette 608 is constructed to hold a plurality of magazine apparatuses such that a large number of glassware can be processed simultaneously. Each magazine apparatus 100 is positioned in the cassette 608 utilizing a cassette loader 610. The cassette loader 610 may be a mechanical gripping device, such as a caliper or the like, which is capable of gripping one or more magazine apparatuses at a time. Alternatively, the gripping device may utilize a vacuum system to grip the magazine apparatuses 100. The cassette loader 610 may be coupled to a robotic arm or other, similar device capable of positioning the cassette loader 610 with respect to the cassette 608 and the magazine apparatuses 100. Alternatively, a plurality of magazine apparatuses may be manually stacked, one atop the other, and manually loaded into a cassette. The term cassette, as used herein, refers to a framework into which the stacked magazine apparatuses are loaded into. The cassette generally holds the stacked magazine apparatus together as they proceed through various processing steps, such as ion exchange baths, rinsing, washing, and the like. When multiple magazine apparatuses 100 are loaded into the cassette 608, the magazine apparatuses 100 are positioned such that the spacer coils 132 of the magazine apparatus above is positioned directly over each piece of glassware 900 held in the magazine apparatus below.

In a next step 510, the cassette 608 containing the magazine apparatuses 100 and glassware 900 is transferred to an ion exchange station and loaded into an ion exchange tank 614 to facilitate chemically strengthening the glassware 900. The cassette 608 is transferred to the ion exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion exchange station with an overhead rail system, such as a gantry crane or the like. Alternatively, the cassette transfer device 612 and attached cassette 608 may be conveyed from the cassette loading area to the ion exchange station with a robotic arm. In yet another embodiment, the cassette transfer device 612 and attached cassette 608 may be conveyed from the cassette loading area to the ion exchange station with a conveyor and, thereafter, transferred from the conveyor to the ion exchange tank 614 with a robotic arm or an overhead crane.

Once the cassette transfer device 612 and attached cassette 608 are at the ion exchange station, the cassette 608 and the glassware 900 contained therein may optionally be preheated prior to submerging the cassette 608 and the glassware 900 in the ion exchange tank 614. In some embodiments, the cassette 608 may be preheated to a temperature greater than room temperature and less than or equal to the temperature of the molten salt bath in the ion exchange tank. For example, the glassware may be preheated to a temperature from about 300° C.-500° C. However, it should be understood that the preheating step is optional due to the relatively low thermal mass of the magazine apparatuses 100 described herein.

The ion exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion exchange of the glassware.

In step 512, the glassware 900 are ion exchange strengthened in the ion exchange tank 614. Specifically, the glassware are submerged in the molten salt and held there for a period of time sufficient to achieve the desired compressive stress and depth of layer in the glassware 900. As the glassware 900 are submerged, the glassware initially have positive buoyancy as air escapes from the interior volume of the glassware and is replaced with molten salt. As the glassware rise due to the positive buoyancy, the top of each piece of glassware comes into contact with the round surface of the spacer coils 132 of the magazine apparatus above, thereby preventing contact between the bottom surface of the magazine apparatus above and mitigating damage to the glassware. In addition the basket-like open structure of the ware keepers 120 allows the molten salt bath to contact all surfaces of the glassware, improving the uniformity of the compressive stress induced in the surface of the glassware.

In one embodiment, the glassware 900 may be held in the ion exchange tank 614 for a time period sufficient to achieve a depth of layer of up to about 100 µm with a compressive stress of at least about 200 MPa or even 250 MPa. In embodiments, the glassware 900 may be held in the ion exchange tank 614 for a time period sufficient to achieve a depth of layer of up to about 100 µm with a compressive stress of at least about 300 MPa or even 350 MPa. The holding period may be less than 30 hours or even less than 20 hours. However it should be understood that the time period with which the glassware are held in the tank 614 may vary depending on the composition of the glass container, the composition of the bath of molten salt 616, the temperature of the bath of molten salt 616, and the desired depth of layer and the desired compressive stress.

After the glassware 900 are ion exchange strengthened, the cassette 608 and glassware 900 are removed from the ion exchange tank 614 using the cassette transfer device 612 in conjunction with a robotic arm or overhead crane. During removal from the ion exchange tank 614, the basket-like open structure of the ware keepers 120 of the magazine apparatus 100 allows the molten salt within the magazine apparatus to readily drain from each magazine apparatus. After the cassette 608 is removed from the ion exchange tank 614, the cassette 608 and the glassware 900 are suspended over the ion exchange tank 614 and the cassette 608 is rotated about a horizontal axis such that any molten salt remaining in the glassware 900 is emptied back into the ion exchange tank 614. As the cassette 608 is rotated, the glassware 900 slides within the retention body 122 of each ware keeper 120 towards the bottom surface of the magazine apparatus located above. The glassware 900 is prevented from blunt force contact with the bottom surface of the magazine apparatus located above by the spacer coils 132 of the magazine apparatus located above. The spacer coils 132 act as spring cushions that slow and arrest the sliding motion of the glassware 900, thereby mitigating damage to the glassware due to blunt force contact. Thereafter, the cassette 608 is rotated back to its initial position and the glassware are allowed to cool prior to being rinsed.

The cassette 608 and glassware 900 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glassware 900 are lowered into a rinse tank 618 containing a water bath 620 to remove any excess salt from the surfaces of the glassware 900. The cassette 608 and glassware 900 may be lowered into the rinse tank 618 with a robotic arm, overhead crane or similar device which couples to the cassette transfer device 612. The glassware initially have a positive buoyancy upon being submerged in the rinse tank 618. However, as the glassware rise, the top of each piece of glassware comes into contact with the round surface spacer coils 132 of the magazine apparatus above, thereby preventing contact between the underside of the magazine apparatus above and mitigating damage to the glassware.

The cassette 608 and glassware 900 are then withdrawn from the rinse tank 618, suspended over the rinse tank 618, and the cassette 608 is rotated about a horizontal axis such that any rinse water remaining in the glassware 900 is emptied back into the rinse tank 618. As the cassette 608 is rotated, the glassware 900 slides within the retention body 122 of each ware keeper 120 towards the bottom surface of the magazine apparatus located above. The glassware 900 is prevented from blunt force contact with the bottom surface of the magazine apparatus located above by the spacer coils 132 of the magazine apparatus located above. The spacer coils 132 act as spring cushions that slow and arrest the sliding motion of the glassware 900, thereby mitigating damage to the glassware due to blunt force contact. In some embodiments, the rinsing operation may be performed multiple times before the cassette 608 and glassware 900 are moved to the next processing station.

In one particular embodiment, the cassette 608 and the glassware 900 are dipped in a water bath at least twice. For example, the cassette 608 may be dipped in a first water bath and, subsequently, a second, different water bath to ensure that all residual alkali salts are removed from the surface of the glass article. The water from the first water bath may be sent to waste water treatment or to an evaporator.

In a next step 516, the magazine apparatuses 100 are removed from the cassette 608 with the cassette loader 610. Thereafter, in step 518, the glassware 900 are unloaded from the magazine apparatuses 100 with the magazine loader 602 and transferred to a washing station. In step 520, the glassware are washed with a jet of de-ionized water 624 emitted from a nozzle 622. The jet of de-ionized water 624 may be mixed with compressed air.

Optionally, in step 521 (not depicted in FIG. 13), the glassware 900 are transferred to an inspection station where the glassware are inspected for flaws, debris, discoloration and the like.

It should now be understood that the magazine apparatuses described herein may be used to hold and retain glassware during processing. Forming the ware keepers of the magazine apparatus from open, basket-like wire coils mitigates the introduction of flaws in the glassware retained within the magazine apparatus. Ware keepers formed in this manner also reduce the thermal mass and surface area of the magazine apparatus which improves ion exchange performance when the magazine apparatuses are used to facilitate strengthening of the glassware contained therein by ion exchange.

While the magazine apparatuses have been shown and described herein being used in conjunction with glass containers, such as glass vials, it should be understood that the magazine apparatuses may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus for holding and retaining glassware during processing, the apparatus comprising:
a plurality of ware keepers for receiving glassware, wherein each ware keeper of the plurality of ware keepers comprises:
a retention body comprising a wire coil circumscribing a glassware receiving volume, wherein a lower-most winding of the wire coil of the retention body has a winding diameter that is less than a winding diameter of windings in the remainder of the retention body such that the lower-most winding of the wire coil of the retention body forms a ware stop in the retention body; and
a spacer coil extending from the wire coil of the retention body below the ware stop; and
a base frame comprising a plurality of apertures extending through the base frame and a plurality of support rods supported over the top surface of the base frame and extending across a length of the base frame, wherein each of the plurality of ware keepers is positioned in a corresponding aperture in the base frame such that the retention body of each ware keeper is above a top surface of the base frame and the spacer coil of each ware keeper is below a bottom surface of the base frame and each ware keeper of the plurality of ware keepers is engaged with one of the plurality of support rods.

2. The apparatus of claim 1, wherein adjacent windings of the wire coil are spaced apart from one another.

3. The apparatus of claim 1, wherein at least a portion of the lower-most winding of the retention body is substantially linear and extends at least partially across an area circumscribed by a preceding winding of the retention body.

4. The apparatus of claim 1, wherein the winding diameter of at least a portion of the lower-most winding of the wire coil of the retention body progressively decreases.

5. The apparatus of claim 1, wherein a winding diameter of the spacer coil is less than a winding diameter of the windings in at least a portion of the retention body.

6. The apparatus of claim 1, wherein the wire coil is formed from wire having a substantially circular cross section.

7. The apparatus of claim 1, wherein each ware keeper of the plurality of ware keepers comprises a retention stem extending from an upper-most winding of the retention body, wherein the retention stem is engaged with one of the plurality of support rods.

8. The apparatus of claim 1, further comprising a plurality of support legs extending substantially perpendicular to the top surface of the base frame, wherein the support legs are positioned between adjacent ware keepers.

9. The apparatus of claim 8, wherein a height of the support legs above the top surface of the base frame is less than or equal to a height of the retention body of each of the plurality of ware keepers above the top surface of the base frame.

10. The apparatus of claim 1, wherein:
the spacer coil of the retention body of each ware keeper is coupled to the ware stop of the retention body of each ware keeper with a spacer stem;
each aperture of the plurality of apertures in the base frame comprises a datum slot extending through the base frame; and
the spacer stem of the retention body of each ware keeper is engaged with a corresponding datum slot in the base frame.

11. The apparatus of claim 10, further comprising a locking plate coupled to at least one of the top surface and the bottom surface of the base frame, wherein:
the locking plate comprises a plurality of locking slots corresponding to the datum slots in the base frame, wherein a slot direction of the locking slots is rotationally offset relative to a slot direction of the corresponding datum slots; and
the spacer stem of the retention body of each ware keeper is engaged with a corresponding locking slot of the locking plate thereby preventing disengagement of the ware keeper from the base frame.

12. The apparatus of claim 11, wherein the slot direction of the locking slots is rotationally offset relative to the slot direction of the corresponding datum slots by greater than 80 degrees and less than or equal to about 180 degrees.

13. The apparatus of claim 11, wherein the locking plate further comprises a plurality of support legs extending substantially perpendicular to the top surface of the base frame, wherein the support legs are positioned between adjacent ware keepers.

14. The apparatus of claim 13, wherein a height of the support legs above the top surface of the base frame is less than or equal to a height of the retention body of each of the plurality of ware keepers above the top surface of the base frame.

15. The apparatus of claim 1 further comprising at least one stand-off extending from at least one of the top surface and the bottom surface of the base frame.

16. An assembly for holding and retaining glassware during processing, the assembly comprising:
a first magazine apparatus comprising:
a first plurality of ware keepers for receiving glassware, wherein each ware keeper of the first plurality of ware keepers comprises:
a retention body comprising a wire coil circumscribing a glassware receiving volume, wherein a lower-most winding of the wire coil of the retention body forms a ware stop in the retention body; and
a spacer coil extending from the wire coil of the retention body below the ware stop;

a first base frame comprising a plurality of apertures extending through the first base frame, wherein each of the first plurality of ware keepers is positioned in a corresponding aperture in the first base frame such that the retention body and spacer coil of each ware keeper are on opposite sides of the first base frame;

a second magazine apparatus comprising:

a second plurality of ware keepers for receiving glassware, wherein each ware keeper of the second plurality of ware keepers comprises:

a retention body comprising a wire coil circumscribing a glassware receiving volume, wherein a lower-most winding of the wire coil of the retention body forms a ware stop in the retention body; and a spacer coil extending from the wire coil of the retention body below the ware stop; and a second base frame comprising a plurality of apertures extending through the second base frame, wherein each of the second plurality of ware keepers is positioned in a corresponding aperture in the second base frame such that the retention body and spacer coil of each ware keeper are on opposite sides of the second base frame, wherein the second magazine is positioned atop and spaced apart from the first magazine such that the spacer coil of each ware keeper of the second plurality of ware keepers is positioned over the glassware receiving volume of a corresponding ware keeper of the first plurality of ware keepers.

\* \* \* \* \*